(12) United States Patent
Indenbom

(10) Patent No.: US 9,129,098 B2
(45) Date of Patent: Sep. 8, 2015

(54) METHODS OF PROTECTING SOFTWARE PROGRAMS FROM UNAUTHORIZED USE

(75) Inventor: Eugene Indenbom, Moscow (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 13/244,269

(22) Filed: Sep. 23, 2011

(65) Prior Publication Data

US 2012/0047074 A1    Feb. 23, 2012

Related U.S. Application Data

(63) Continuation-in-part of application No. 12/240,231, filed on Sep. 29, 2008.

(60) Provisional application No. 60/976,358, filed on Sep. 28, 2007.

(51) Int. Cl.
*G06F 21/00* (2013.01)
*G06F 21/12* (2013.01)

(52) U.S. Cl.
CPC ................................. *G06F 21/128* (2013.01)

(58) Field of Classification Search
USPC ......................................................... 705/59
See application file for complete search history.

(56) References Cited

U.S. PATENT DOCUMENTS

| | | |
|---|---|---|
| 5,199,066 A | 3/1993 | Logan |
| 5,204,897 A | 4/1993 | Wyman |
| 5,260,999 A | 11/1993 | Wyman |
| 5,291,598 A | 3/1994 | Grundy |
| 5,375,206 A | 12/1994 | Hunter et al. |
| 5,438,508 A | 8/1995 | Wyman |
| 5,553,139 A | 9/1996 | Ross et al. |
| 5,553,143 A | 9/1996 | Ross et al. |
| 5,579,222 A | 11/1996 | Bains et al. |
| 5,671,412 A | 9/1997 | Christiano |
| 5,745,879 A | 4/1998 | Wyman |
| 5,758,069 A | 5/1998 | Olsen |
| 5,809,145 A | 9/1998 | Slik et al. |
| 5,845,065 A | 12/1998 | Conte et al. |
| 5,903,650 A | 5/1999 | Ross et al. |
| 5,905,860 A | 5/1999 | Olsen et al. |
| 6,023,766 A | 2/2000 | Yamamura |
| 6,189,146 B1 | 2/2001 | Misra et al. |
| 6,260,141 B1 | 7/2001 | Park |
| 6,327,652 B1 | 12/2001 | England et al. |
| 6,820,063 B1 | 11/2004 | England et al. |
| 6,824,051 B2 | 11/2004 | Reddy et al. |
| 6,859,699 B2 | 2/2005 | Carroll et al. |
| 6,915,278 B1 | 7/2005 | Ferrante et al. |
| 6,920,567 B1 | 7/2005 | Doherty et al. |

(Continued)

FOREIGN PATENT DOCUMENTS

JP    2007206928 A  *  8/2007

*Primary Examiner* — James A Reagan
(74) *Attorney, Agent, or Firm* — LeighAnn Weiland; Veronica Weinstein

(57) ABSTRACT

A method for controlling or protecting the use of a software licensed product is provided. The method comprises, for example, encrypting protected data associated with the software licensed product with a key derived from code of a licensing module, distributing the encrypted protected data associated with the software licensed product to user devices, tracking usage of a software licensed product, and for all but one instance of the usage of the software licensed product terminating the usage of the software license product by allowing execution of the software licensed product upon successful decryption of the encrypted protected data.

17 Claims, 5 Drawing Sheets

(56) References Cited

U.S. PATENT DOCUMENTS

| | | |
|---|---|---|
| 6,993,664 B2 | 1/2006 | Padole et al. |
| 7,024,696 B1 | 4/2006 | Bahar |
| 7,150,023 B1 | 12/2006 | Sauvage |
| 7,158,953 B1 | 1/2007 | DeMello et al. |
| 7,171,662 B1 | 1/2007 | Misra et al. |
| 7,266,731 B2 | 9/2007 | Ali-Santosa et al. |
| 7,278,164 B2 | 10/2007 | Raiz et al. |
| 7,337,147 B2 | 2/2008 | Chen et al. |
| 7,343,297 B2 | 3/2008 | Bergler et al. |
| 7,359,881 B2 | 4/2008 | Stefik et al. |
| 7,359,882 B2 | 4/2008 | Eng |
| 7,363,318 B1 | 4/2008 | Dere et al. |
| 7,392,375 B2 | 6/2008 | Bartram et al. |
| 7,395,245 B2 | 7/2008 | Okamoto et al. |
| 7,404,084 B2 | 7/2008 | Fransdonk |
| 7,409,543 B1 | 8/2008 | Bjorn |
| 2001/0034712 A1 | 10/2001 | Colvin |
| 2006/0101288 A1* | 5/2006 | Smeets et al. ............... 713/194 |
| 2011/0231941 A1* | 9/2011 | Singer et al. ................ 726/29 |

* cited by examiner

1

METHODS OF PROTECTING SOFTWARE PROGRAMS FROM UNAUTHORIZED USE

CROSS-REFERENCE TO RELATED APPLICATIONS

For purposes of the USPTO extra-statutory requirements, the present application constitutes a continuation-in-part of U.S. patent application Ser. No. 12/240,231 that was filed on 29 Sep. 2008, which is currently co-pending, or is an application of which a currently co-pending application is entitled to the benefit of the filing date. The '231 Application claims priority, in turn, to U.S. 60/976,358, filed Sep. 28, 2007.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD

Embodiments of the present invention relate to a method and system for protecting software from unauthorized use.

BACKGROUND

Many methods exist to protect software from unauthorized use. Some of these methods include, for example, activation by Internet, activation by email, activation by phone. Other methods include the use of time-based licenses that expire a predetermined period after the software is installed or involve the use of monitoring a number of activations based on an installation identifier (ID).

SUMMARY

This Summary is provided to introduce a selection of concepts in a simplified form that are further described below in the Description. The Summary is not intended to identify key features or essential features of the claimed subject matter, nor is it intended to be used as an aid in determining the scope of the claimed subject matter.

In one embodiment, a method for controlling or protecting the use of a software licensed product is provided. The method comprises, for example, encrypting protected data associated with the software licensed product with a key derived from code of a licensing module, distributing the encrypted protected data associated with the software licensed product to user devices, tracking usage of a software licensed product, and for all but one instance of the usage of the software licensed product terminating the usage of the software license product by allowing execution of the software licensed product upon successful decryption of the encrypted protected data.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention discloses techniques for licensing and protecting software from unauthorized use. Each of these techniques is described in detail below. In this description, the term "software licensed product" refers to software as well as to digital content sold under a license.

Trial Activation

Figure 1:
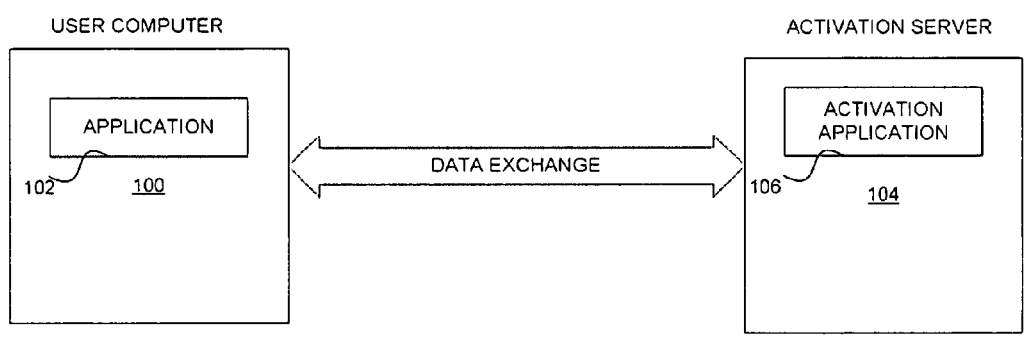
FIG. 1 shows a data exchange between an activation server and a user computer during trial activation, in accordance with one embodiment of the invention.

Referring to FIG. 1, a user computer 100 is loaded with an application 102. The application 102 is initially in an unactivated condition in which it is entirely non-functional or at least partly non-functional. Trial activation as disclosed herein is the process by which the application 102 may be activated so that it can be used. More particularly, trial activation comprises a data exchange sequence between the application 102 and an activation server 104. In one embodiment, the data exchange sequence includes an activation request by the application 102 to the activation server 104. Responsive to the activation request, an activation application 106 running on the activation server 104 sends a data token to the application 102. Subsequent processing of the data token by the application 102 allows the user to use the application 102 or part of its functionality on the user computer 100 either indefinitely or for a limited time period.

In accordance with different embodiments of the invention, the data exchange between the application 102 and the activation server 104 may be electronic, through means of human communication, or by any other method. For example, the data exchange may occur through the Internet. In this case the both the activation request and the data token are transmitted using the HTTP/IP protocol (Hypertext Transfer Protocol over the Internet Protocol). In the case of human communication, a user calls a predetermined telephone number to request the data token in the form of an activation code from the activation server 104. In this case, the activation code is input into the application 102 by a user in order to render the application functional.

Thus, trial activation grants a user a right to use software or digital content for a limited period of time for the purpose of trial and evaluation. On the other hand, it allows the digital rights owner to control the trial period granted to the user. Trial activation does not require the user to present to the application or activation server any kind of proof of purchase or any other information. The user must, however, select a communication method and facilitate the data exchange if required by the method selected.

Intranet Per-Seat License Distribution

A "license" is an electronic data token that contains a set of permissions and restrictions on the use of the licensed software or digital content on the given computer or distributed computer system. A "Per-Seat" license is a license which can be used only on a single computer, to which is "bound" at the time of activation. An inherent restriction of a Per-Seat license is the necessity to activate each license on the user computer where the license is being installed, which may create significant complications for administrators of medium and large Intranets. Embodiments of the invention disclose a distribution method in which the Per-Seat license installation and activation procedure is automated, thus significantly reducing administrative overhead.

Figure 2:
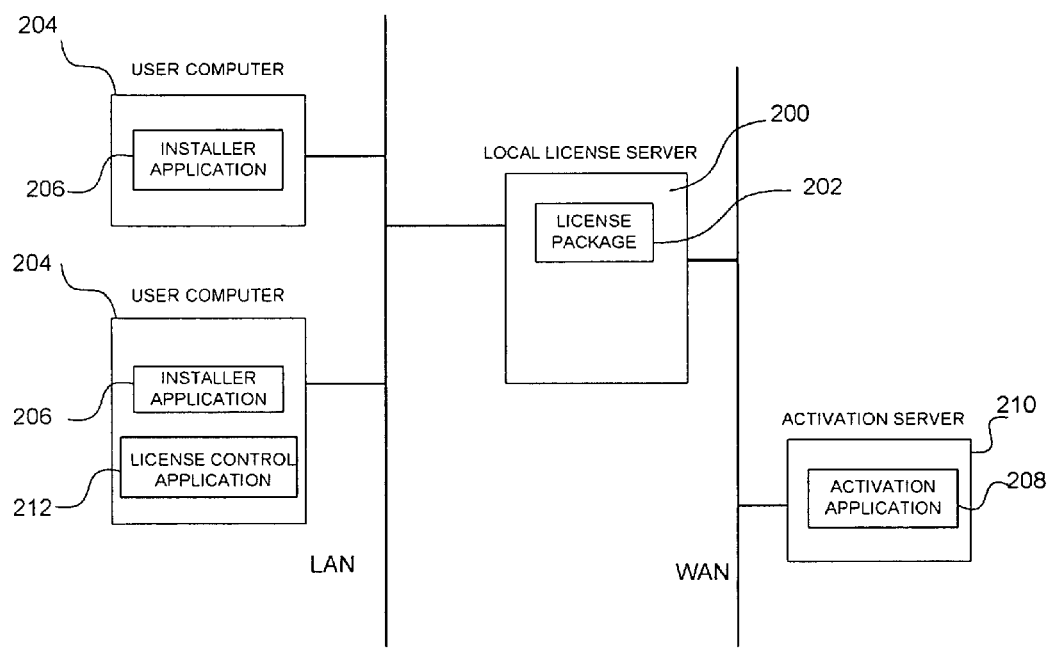
FIG. 2 shows network configuration comprising a local license server configured to install licenses on a plurality of user computers, in accordance with one embodiment of the invention.

FIG. 2 of the drawings shows a network configuration for practicing the Intranet Per-Seat license distribution method; The Intranet Per-Seat license distribution method may be outlined as follows:

1. A network administrator installs a dedicated local license server 200.
2. The network administrator uploads a Per-Seat license package 202 to the license server 200. The Per-Seat licenses in the package cannot be used on user computers without further activation.
3. The network administrator may optionally assign the exact user computers 204 on which licenses from the license package 202 should be installed and activated.
4. The network administrator schedules an unattended installation of licensed software or digital content on the user computers 204 within a local area network (LAN). Alternatively, the installation may be started manually by intranet users. Although only two user computers 204 have been shown in FIG. 2 of the drawings, it is to be understood that in practice the LAN may include a large number of user computers 204." In one embodiment, the LAN and may be in the form of a corporate intranet.
5. Each user computer 204 is provisioned with an installer application 206. During installation, the installer application 206 connects to the license server 200 and retrieves the non-activated Per-Seat licenses to be installed and activated on the computer 204.
6. The installer application 206 communicates to the license server 200 the identity of the user computer 204 on, which the license is being installed and the license server 200. This communication between the license installer application 206 and the license server 200 takes the form of a license request. The license server 200 sends the license request to the activation server 210 for further processing. Along with the license request, a license identity and the identity of the user computer 204 that made the license request is sent to the license server 200. The activation server 210 responds by generating a license, which it then sends to the license server 200. Finally, the license server 200 forwards the license to the user computer 204. Thus, the licensing server 200 acts as proxy between each user computer 204 and the activation server 210. Advantageously, all communications between external (to LAN) resources are performed by the local license server 200, thereby increasing LAN security and simplifying configuration of the LAN.
7. In one embodiment, if the license server 200 is not able to perform activation or automatic activation is disabled by administrative means, the license installed is scheduled for activation by the software installed on the user computer. In this case, the activation is performed by the user of the user computer on the first use of the software.
8. In all activation scenarios, the license installation and activation status is reported back to the license server 200 and can be reviewed by the network administrator.
9. In one embodiment, the license package 202 is provisioned in the license server 200 by and application 208 the activation server 210. In one embodiment~the license package 202 may be digitally signed by the activation server 210, thereby authenticating that the license package 202 is provided by an authorized vendor.

Local Licensing Service

The Per-Seat scheme for software or digital content licensing typically allows an unlimited number of copies of software to be run on the computer where the license was activated. In one embodiment, a local licensing service (a dedicated process running in the background) is provided. Advantageously, the local licensing service efficiently controls the number of copies allowed and resolves problems with concurrent storage of license usage counters by multiple copies of the software running in parallel, as is described below.

Network License Control

Figure 3:
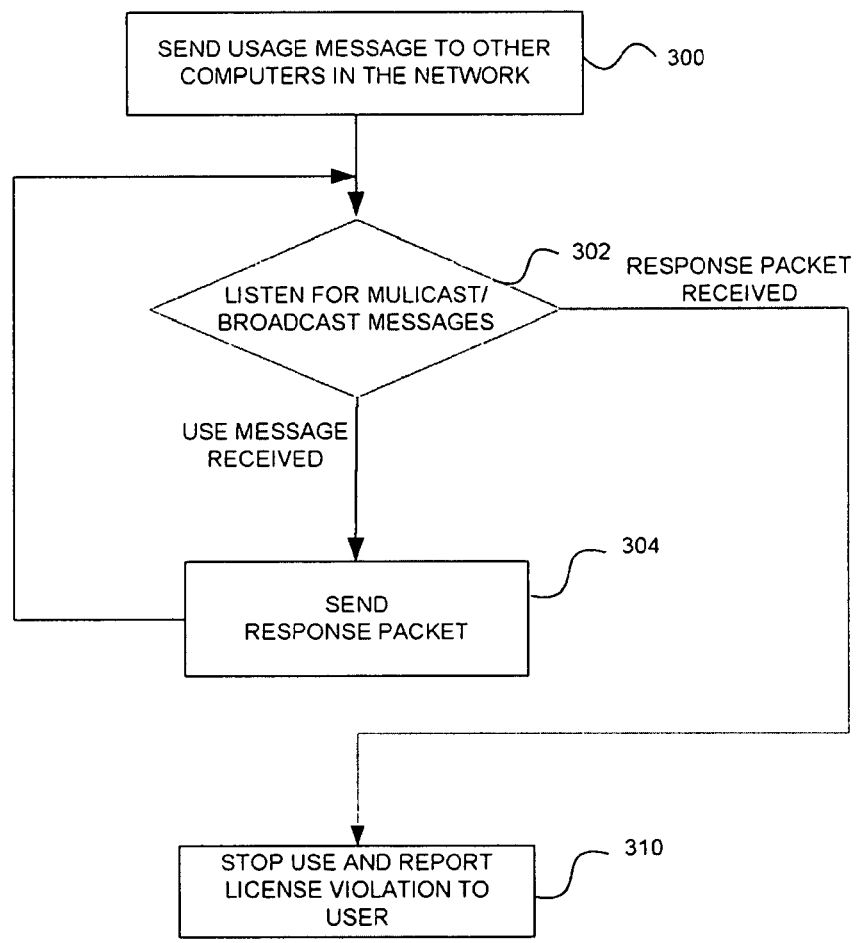
FIG. 3 shows a flowchart of a network license control method, in accordance with one embodiment of the invention.

Many license activation systems allow activation of the same license on several computers to allow the user to upgrade computer hardware or to permit non-concurrent use of the software or digital content on several computers (e.g. home and office computers). In such licensing systems, network multicast and broadcast protocols (such as Win32 mailslots or transmission control protocol over Internet protocol TCP/IP broadcast/multicast datagrams) can be used to control non-concurrent usage of the software or digital content in an Intranet. In one embodiment, there is disclosed a network license control technique. The technique is executed by a license control application 212 installed on each user computer 204. A flowchart of the technique is shown in FIG. 3 for drawings. Referring to FIG. 3:

1. Upon software startup, and at block 300, a network license control application 212 sends a usage message to other computers in the network (intranet). In one embodiment, the usage message may be a broadcast/multicast message that informs other software copies running in the intranet that a license for the software is in use.

2. At block 302, the application 212 starts to listen on a well-known multicast/broadcast communication endpoint for messages sent by other computers in the intranet.
3. Each copy of the software running on a user computer 204 within the intranet and using the same license receives the usage message.
4. If a usage message is received from other applications, at block 304, the application 212 sends a response packet indicating concurrent use of the license. This is termed a "license in use message". The "license in use message" is sent to the user computer 204 from which the usage message was received.
5. Otherwise, if a response packet is received with the "license in use message", at block 310, use of the License is stopped and a license violation is reported to the user. If the application 212 determines that there is no other license that could be used to provide at least minimal functionality to the user, the application 212 is also terminated.

Code Integrity Check

One of the major requirements for a licensing system is the ability of the software to check itself for modifications that violate the built-in licensing control. The most common technology is digital signature verification of the executable code. The biggest drawback of this technology is the following "chicken and egg" problem: How to check the module that verifies digital signatures?

Figure 4:
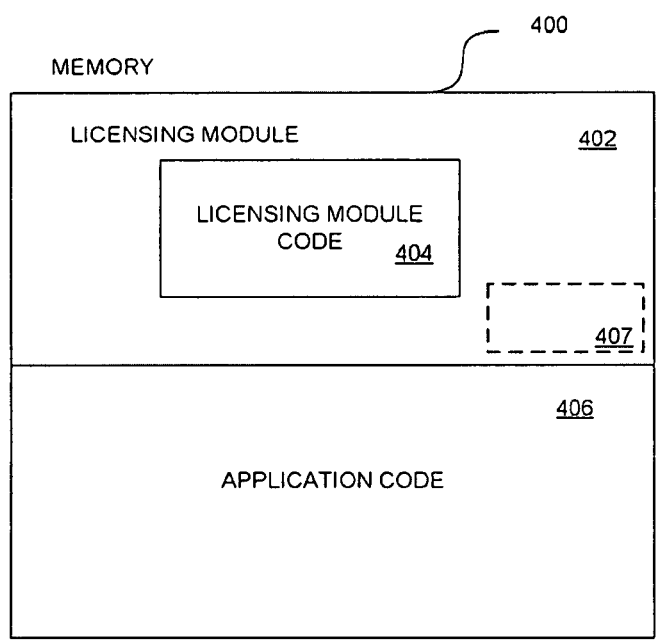
FIG. 4 shows the organization of a memory on a user computer, in accordance with one embodiment of the invention.

In one embodiment, there is provided a technique which encrypts the data vital for program execution with a password derived from the checksum or the message digest of the executable module itself. This is illustrated with reference to FIG. 4 of the drawings, which shows a memory 400 organized into a licensing module 402, and application code 406. The memory 400 is part of a user computer. As will be seen, the licensing module 402 includes licensing module code 404 that performs signature verification on the executable code 406. In accordance with the invention, protected data 407 is encrypted with a key based on the checksum or the message digest of the licensing module code 404 itself. The protected data 407 is vital for program execution and may be contained in licensing module 402 or application code 406. The protected data 407 may be as well as plain data as executable code of either licensing module 402 or application code 406. Therefore, modifications to the licensing module code 404 will render the software non-functional as the protected data 407 will no longer be decryptable. The use and purpose of the program data 407 may be carefully hidden or obscured from a hacker. To further enhance software protection the protected data 407 may be used only during application startup phase, e.g. to build internal application data tables, thus complicating the task of tracking its location, purpose and use. Advantageously this will at least prevent its discovery and subsequent tampering by a hacker. In order to crack the self-integrity check of the module protected by this technique, additional steps need to be taken, such as the location of the encrypted data in the module, data decryption and re-encryption with a modified module checksum, apart from the conventional rare byte attack (changing several bytes of code at vital points that make decisions on the use of protected functionality or perform code verification).

Activation in Limited Data Transfer Scenarios

A license is a collection of permissions and restrictions on the software or digital content usage on a user computer. License activation over the phone restricts the data exchange between the software on the user computer and the activation server to the license serial number, the user computer identity, and the activation code.

In one embodiment, the invention uses a set of rules known to both the activation server and the software running on a user computer to transmit license parameters from the activation server to the user computer using a limited set of data consisting of the serial number and the activation code.

In this scenario, a license activation code is a numeric string composed of the following bit fields: the digital signature of the license serial number, user computer identity data token, license parameters (i.e., set of permissions and restrictions on the use of the licensed software or digital content), computer identity information, bit masks for Boolean license parameters (e.g., permission to use certain functionality), bit fields for Integer license parameters (e.g., limit on number of pages in document), and the checksum for checking the correctness of the user input. Computer identity information comprises a data token that uniquely identifies a computer, without disclosing any sensitive user or hardware-specific information. Computer identity information may comprise a secure digest of hardware configuration, Original Equipment Manufacturer (OEM) serial numbers assigned to computer parts and firmware components such as hard drives as well as other unique IDs assigned by software.

For example, a serial number may have the format: SPAS-2045-xxxx-xxxx-xxxx-xxxx. The following exemplary serial number rule may be used to determine from the letters and digits in the serial number a basic set of license parameters as follows:

S this is license for our a particular product called "SuperTool". Thus, the license parameter "ProductName" has the value "SuperTool".

P—the value "P" indicates that the license is for the "professional edition" which may have enhanced functionality. For example in the professional edition, features called "MainFeature1", and "MainFeature2" are enaabled. Thus, inclusion of the value "P" in the license yields the following parameters:
"EditionName" is "Professional"
"CanDoMainFeature1" is "true"
"CanDoMainFeature2" is "true"

The letters and the digits in the license may be processed in the above manner to extract all basic license parameters.

The activation code provided by activation server is another data token available to licensing component to reconstruct complete set of license parameters. In this example, the activation code is a digit string (please, note that concrete format of activation code is not material to the invention). The last three digits of the activation code constitute the checksum of the first digits. This checksum enables checking of user input for typographical errors. The rest of activation code can be converted into a large integer, say of 250 bits. The lower 200 bits are a digital signature as described above. The next 32 bits are bit flags for license parameters. For example:

Bit 1 defines. Boolean license parameter "CanUseDynamicFeature1". If bit is 1 then parameter is "true". Otherwise parameter is "false".

Bit 2 defines Boolean license parameter "CdllUseDYCldmlcFeatu:ce2".

Bits from 3 to 10 contain number of pages a document of our "SuperTool" can produce. If all these bits are I, then number of pages is unlimited.

And so forth.

Finally, a last 18 bits contain the date of license activation.

License Activation Date

A major challenge in using time-restricted licenses is how to set the start date for the license validity period. The common approach to setting the start date is to use the date of the license generation or date of the first use. The major drawback of the former approach is that there could be a substantial difference in time between license generation and actual sale to the end user, reducing the period during which the license is available to the end user. The latter approach has an inherent limitation of storing the date of the first use on the end user's computer, leading to a possibility for the end user to tamper with stored date.

In one embodiment, the invention uses the date of the first license activation as the start date and stores it either in the activation code or in license itself. In this case, the start date is actually the date of the first use of the software or digital content by the end user and, at the same time, it can be verified using a digital signature stored in the same activation code.

License Package

In many use cases, the end user can have more than one license for one product installed on his/her computer. A typical scenario would be a licensing system having separate licenses for digital content packages.

In one embodiment, the invention employs automatic license parameter merging semantics for building the final package license to be used by the application. In one embodiment, the application 212, at startup, requests all available licenses from a licensing control application (service) running as a separate process 212 or licensing module within the application process itself. All available licenses are then merged into a single package license by the license control application, according to rules defined in a licensing schema. After construction of the merged license package, the application 212 once again deals with 'one single license, greatly simplifying the task of determining final permissions and restrictions on program usage.

In one embodiment, merge rules are defined for each license parameter type separately:

1. Boolean license parameters:
    a. Permission to use a software feature—the value for this parameter for each available license is merged by a logical OR operation. The result is that if any license permits use of the feature, use is also granted in the package license
    b. Restriction to use software feature—the value for this parameter for each available license is merged by a logical AND operation. The result is that if any license does not contain a restriction, the package license also does not contain a restriction.
2. Integer license parameter. This parameter contains a number that controls the operation and functioning of the application for which the license is granted. The integer license parameter may include, e.g. an integer representing a limitation on the number of CPUs to use for parallel computation or some limit on the number of pages or other objects produced by the application in single document. The integer license parameter for all available licenses may be combined as follows in the final license package:
    a. SUM logic: the limit in the package license is the sum of the limits for all available licenses.
    b. MAX logic: the limit in the package license is set to a value equal to the maximum value for the integer license parameter across all available or contained licenses.
    c. MIN logic: the limit in the package license is set to a value equal to the minimum value for the integer license parameter across all available or contained licenses.
3. Usage counter: The usage counter is used to effect usage-based control. For example it may be used to restrict the total number of pages or documents that may be viewed or printed by an application, or some other operation performed by the application. The usage counter may be merged in the final license package using the following rule;
    a. SUM logic: total number of uses available from the package license is a sum of uses available in the contained licenses.
4. A generic parameter (e.g. a string, Boolean, integer, etc.) may be merged into the final license package in accordance with the following rule:
    a. Keep if equal: the package license contains the said parameter if and only if in all contained licenses the value of said parameter is the same.

Product Registration

Product registration can be bound to the end user's license serial number in the activation/registration database. On the other hand, each license in use by a particular customer has an activation instance bound to the end user's computer which is identified by a computer identity parameter. Using computer identity as a search key, it is possible to collect all the end user's license serial numbers along with the registration information bound to them. Thus, in one embodiment, information obtained during activation (i.e. computer identity data token) is used as a search key to create full list of licenses belonging to a particular user. This can be useful in a variety of scenarios. One of such scenario includes the handling of technical support calls as follows:
    a. A user calls a technical support center and provides his personal details or one of the serial numbers that he has.
    b. A technical support person can use the serial number to retrieve all licenses belonging to the user, and his registration information. This leads to a more efficient service.
    c. Alternatively, a technical support person can use registration information to find one of the serial numbers registered by the user, and then use this serial number to retrieve all remaining licenses.

Upgrade Check

A conventional product upgrade control scheme known the inventor requires a previous version of a product to be installed or the distribution medium to be present in the end user's computer in order to be eligible for an upgrade. This can be extremely inconvenient to the end user. In one embodiment, the invention verifies the end user's eligibility for the upgrade by checking the license serial number of the previous version an activation database for the software or digital content vendor. The activation may be located on the activation server. The above scheme provides extended control over the number of upgraded licenses from the single serial number of the previous version and better usability to the end user, as it requires only the serial number of the previous version of the product to be known to the end user at the time of product activation. In one embodiment, the activation server receives an activation request containing the serial number for the application to be activated. The activation server checks for a corresponding previous version serial number. A policy is applied based on data stored in the activation database for the previous version serial number and the serial number being activated to decide whether to allow the upgrade operation to proceed or to reject the activation request.

Automating Human Driven Activation

Phone Answering Machine

1. The user places a call to an Activation center, which is a call center used to process incoming telephone calls relating to product activation.

2. On answering machine prompt, the user dials:
   a. The numeric part of the license serial number
   b. The computer identity number provided by the product
3. The phone answering system routs the above information to the activation server.
4. The phone answering system dictates an activation code to the end user.

Fax Answering System
1. The user sends a standardized fax message to the activation center, containing the following information:
   a. The license serial number
   b. The computer identity number provided by the product
2. A data capture system using OCR technology extracts the serial number and computer identity from the fax.
3. The fax answering system routes the above information to the activation server.
4. The fax answering system sends an automatically composed fax message with an activation code back to the user to the originating fax number or to the number provided in the body of the fax.

Premium Content Licenses

In one embodiment, a "premium content license" is provided which is a license that allows the use of digital content with a software application licensed by another license. The availability of a software application license is a prerequisite for the validity of a premium content license. For example, an electronic dictionary may include a shell program and a set dictionaries set with a basic dictionary license. Any additional dictionaries together with corresponding licenses may then be sold separately. To use an additional dictionary license the basic dictionary license would be required.

Terminal Shared License

Centralized computing involves the use of multiple terminals connected to a central computer known as a terminal server. Each connection between a terminal and the terminal server is called a "terminal session." In a standard per-seat license scheme an unlimited number of application copies may be started on the terminal server in terminal sessions with an unlimited number of terminals. This way, an unlimited number of users can concurrently use an application on the terminal server. In one embodiment, the invention provides a technique to limit concurrent use of the same license to only one terminal in a terminal session with the terminal server. The license control application (service) 212 keeps track of all running application copies and grants a license only to application copies within the context of a single terminal session.

Some computer systems (as Microsoft Windows® client operating systems, e.g., MS Windows XP®) support multiple concurrent terminal connections, but do not allow more than one terminal session to be active at a time. For such systems the behavior of license control application 212 may be adjusted so that multiple copies of a software application can be started from different terminals relying on the operating system to ensure that only one terminal (and therefore user) is active at a time.

Figure 5:
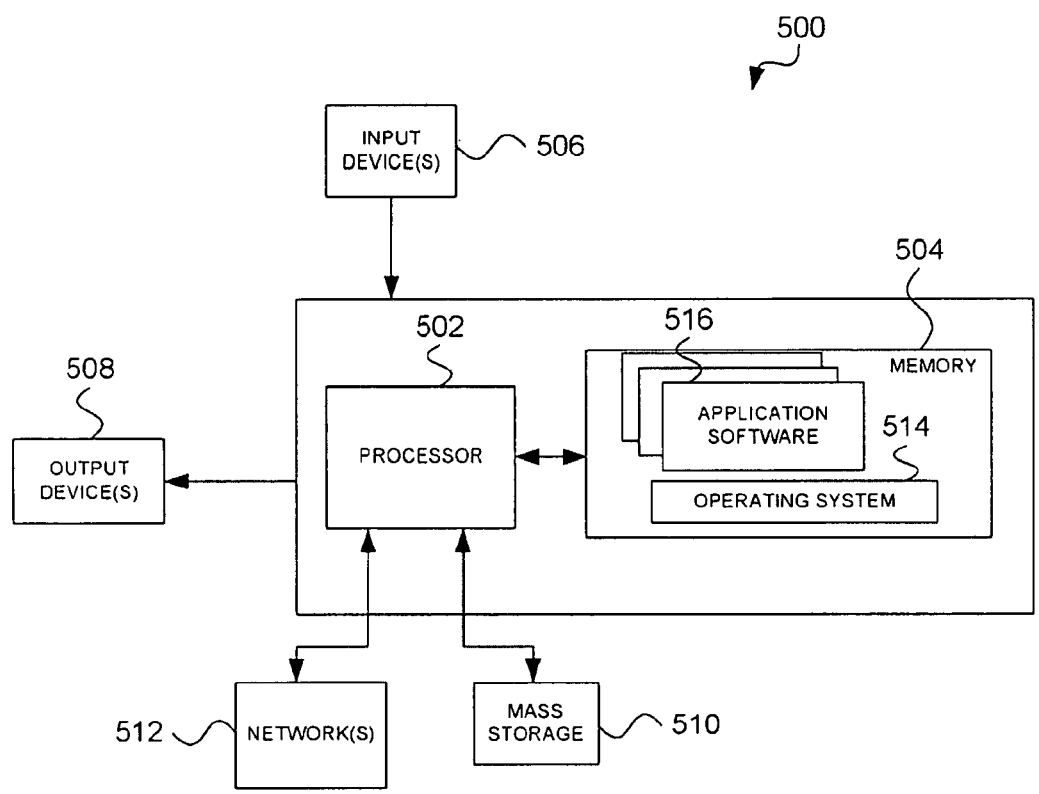
FIG. 5 shows a block diagram of hardware to implement an activation server or a user computer, in accordance with one embodiment of the invention.

FIG. 5 of the drawings shows an example of hardware 500 that may be used to implement the activation server or the user computers described above, in accordance with one embodiment of the invention. The hardware 500 typically includes at least one processor 502 coupled to a memory 504. The processor 502 may represent one or more processors (e.g., microprocessors), and the memory 504 may represent random access memory (RAM) devices comprising a main storage of the hardware 500, as well as any supplemental levels of memory, e.g., cache memories, non-volatile or back-up memories (e.g. programmable or flash memories), read-only memories, etc. In addition, the memory 504 may be considered to include memory storage physically located elsewhere in the hardware 500, e.g. any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse/imaging device, scanner, etc.) and a one or more output devices 508 (e.g., a Liquid Crystal Display (LCD) panel, a sound playback device (speaker). For additional storage, the "hardware 500 may also include one or more mass storage devices 510/e.g./a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the hardware 500 via a network 512, e.~. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

I claim:

1. A method for controlling use of a licensed software product operating on a user device, the method comprising:
   encrypting protected program data associated with the licensed software product with an encryption key derived from a licensing module, wherein the protected program data is required for execution of the licensed software product, and wherein the licensed software product includes (1) the licensing module, (2) application code and (3) encrypted protected program data;
   distributing the licensed software product to the first user device, a second user device or the first user device and the second user device;
   distributing a license control application to one or more of the first user device and the second user device;
   receiving a request for a non-activated per-seat license from either the first user device or second user device during installation of the licensed software product on said user device;
   distributing a non-activated per-seat license to said requesting user device;
   receiving an indication of identity from said requesting user device;
   storing said indication of identity in a storage component;
   sending a licensing request to an activation server, wherein the licensing request includes (1) information about the non-activated per-seat license, and (2) information about said user device, wherein the licensing request facilitates
   by allowing execution of the licensed software product upon successful decryption of the encrypted protected program data by said requesting user device;
   receiving a license from the activation server; and
   sending the license to said requesting user device.

2. The method of claim 1, wherein the encryption key is derived using a derivation method, the derivation method selected from a group consisting of a digest of the code of the licensing module and a checksum of the code of the licensing module.

3. The method of claim 1, wherein the encrypted protected program data is in the code of the licensing module.

4. The method of claim 1, wherein the encrypted protected program data is in the licensing module.

5. The method of claim 4, wherein the licensing module includes a date of first license activation.

6. The method of claim 4, wherein the code of the licensing module includes a date of first license activation.

7. The method of claim 1, wherein the encrypted protected program data is in the licensed software product.

8. The method of claim 1, wherein the encrypted protected program data is executable code of the licensed software product.

9. The method of claim 1, wherein, before distributing the licensed software product to the first user device and a second user device, the method further comprises:
   assigning a date of a first license activation for the licensed software product as a start date for the licensed software product;
   deriving an activation code for the software licensed product based on the start date;
   forming a digital signature of the activation code; and
   storing the digital signature of the activation code in the encrypted protected program data.

10. The method of claim number 9, further comprising verifying the start date based on a digital signature and determining a time usage restriction based on the said start date.

11. The method of claim number 10, where the time usage restriction is a relative time period beginning at the said start date.

12. The method of claim 1, wherein the protected program data is accessed only during a startup phase of the software licensed product.

13. The method of claim 1, wherein the method further comprises:
   after distributing the licensed software product, receiving an indication of successful installation of the licensed software product.

14. The method of claim 1, wherein the method further comprises:
   after sending the licensing request to the activation server, receiving an activation status from either the first user device or the second user device.

15. One or more physical computer-accessible media encoded with instructions for performing a method, the method comprising:
   encrypting protected program data associated with the licensed software product with an encryption key derived from a licensing module, wherein the protected program data is required for execution of the licensed software product, and wherein the licensed software product includes (1) the licensing module, (2) application code and (3) encrypted protected program data;
   distributing the licensed software product to the first user device, a second user device or the first user device and the second user device;
   distributing a license control application to one or more of the first user device and the second user device;
   receiving a request for a non-activated per-seat license from either the first user device or second user device during installation of the licensed software product on said user device;
   distributing a non-activated per-seat license to said requesting user device;
   receiving an indication of identity from said requesting user device;
   storing said indication of identity in a storage component;
   sending a licensing request to an activation server, wherein the licensing request includes (1) information about the non-activated per-seat license, and (2) information about said user device, wherein the licensing request facilitates by allowing execution of the licensed software product upon successful decryption of the encrypted protected program data by said requesting user device;
   receiving a license from the activation server; and
   sending the license to said requesting user device.

16. A method for controlling use of a licensed software product operating on a user device, the method comprising:
   receiving by a user device the licensed software product, wherein the licensed software product includes (1) a licensing module, (2) application code and (3) encrypted protected program data, wherein the encrypted protected program data is encrypted with an encryption key derived from the licensing module, and wherein the protected program data is required for execution of the licensed software product;

receiving by the user device a license control application;

sending by the user device a request for a non-activated per-seat license during installation of the licensed software product on said user device;

receiving by the user device a non-activated per-seat license;

sending by the user device an indication of identity of the user device;

sending a licensing request to a licensing server; and receiving a license for the licensed software product, wherein the license facilitates execution of the licensed software product upon successful decryption of the encrypted protected program data by the user device.

17. The method of claim 16, wherein sending the licensing request occurs at a first execution of the licensed software product on the user device.

* * * * *